United States Patent [19]

Ng et al.

[11] Patent Number: 5,511,308
[45] Date of Patent: Apr. 30, 1996

[54] METHOD AND APPARATUS FOR TURBINE BLADE REHABILITATION

[75] Inventors: M. K. C. Ng, Oakville; J. T. C. Lee, Willowdale; G. C. Poon; L. S. Pullia, both of Mississauga; J. W. Prince; W. J. Crowell, both of Toronto, all of Canada

[73] Assignee: Ontario Hydro, Toronto, Canada

[21] Appl. No.: 239,067

[22] Filed: May 6, 1994

[51] Int. Cl.$^6$ ................................. B23P 15/00
[52] U.S. Cl. ................. 29/889.1; 29/559; 29/705; 29/402.11
[58] Field of Search ............... 29/889.1, 889, 29/889.7, 559, 407, 705, 281.1, 283, 402.01–402.11, 402.13, 402.16; 228/119

[56] References Cited

U.S. PATENT DOCUMENTS

| | | | |
|---|---|---|---|
| 4,176,433 | 12/1979 | Lee et al. | 29/156.8 |
| 4,285,108 | 8/1981 | Arrigoni | 29/156.8 |
| 4,383,677 | 5/1983 | Kerr | 266/87 |
| 4,581,816 | 4/1986 | Klufas et al. | 29/705 |
| 4,590,653 | 5/1986 | Ades et al. | 29/705 |
| 4,673,785 | 6/1987 | Damiani | 219/10.57 |
| 4,805,282 | 2/1989 | Reaves et al. | 29/156.8 |
| 4,842,663 | 6/1989 | Kramer | 156/98 |
| 4,951,390 | 8/1990 | Fraser et al. | 29/889.1 |
| 5,062,205 | 11/1991 | Fraser | 29/889 |
| 5,071,471 | 12/1991 | Miki et al. | 75/10.14 |
| 5,235,745 | 8/1993 | Fraser | 29/889.1 |
| 5,444,911 | 8/1995 | Goodwater et al. | 29/889.1 |
| 5,448,828 | 9/1995 | Willems et al. | 29/889.1 |

FOREIGN PATENT DOCUMENTS

| | | | |
|---|---|---|---|
| 0013772 | 8/1980 | European Pat. Off. | 29/889.1 |
| 0359585 | 3/1990 | European Pat. Off. | 29/889.1 |
| 0795708 | 1/1981 | U.S.S.R. | 29/889.1 |
| 0802566 | 2/1981 | U.S.S.R. | 29/889.1 |

*Primary Examiner*—Irene Cuda
*Attorney, Agent, or Firm*—Ridout & Maybee

[57] ABSTRACT

A method and apparatus for removing erosion shields from the blades of a turbine includes a part for gripping the turbine blade, a part for heating the erosion shield to detach it from the blade, and a part for removing the shield including a pneumatic cylinder actuating a stripping arm once sufficient heat has been applied to the shield to detach it from the blade.

12 Claims, 4 Drawing Sheets

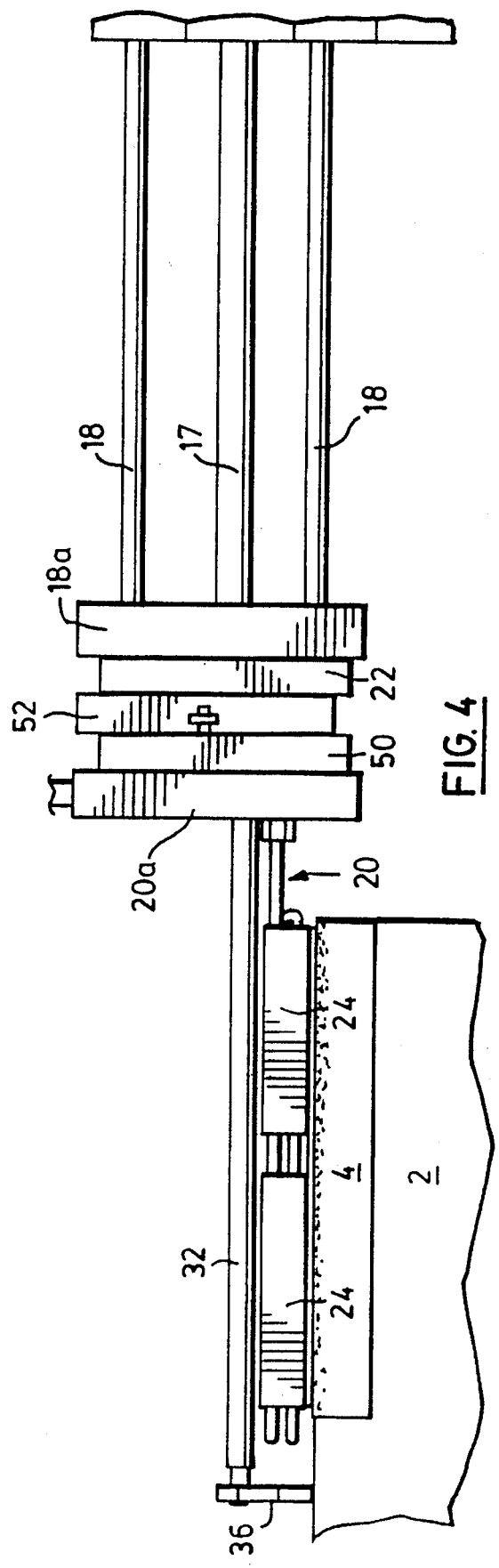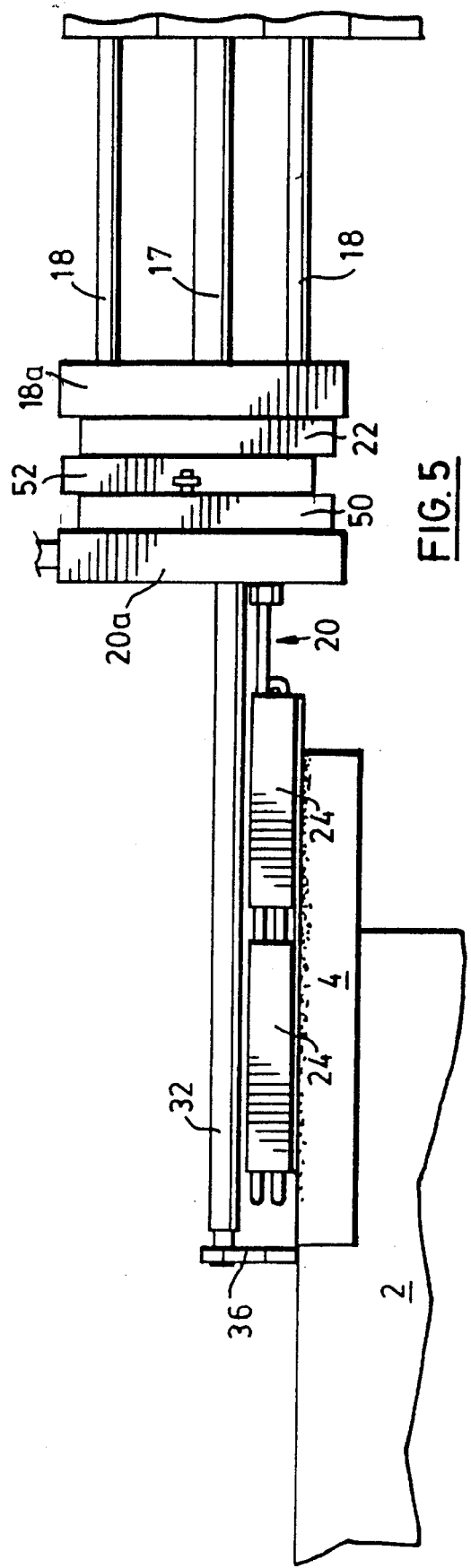

METHOD AND APPARATUS FOR TURBINE BLADE REHABILITATION

FIELD OF INVENTION

This invention relates to a method and apparatus for repairing turbine blades. In particular, the invention relates to a method and apparatus for the debrazing and removal of erosion shields from the blades of a turbine.

BACKGROUND OF THE INVENTION

The blades of a steam turbine erode during operation, particularly along the outer end of the leading edge, due to contact with solid particles and condensed water droplets entrained in the air flowing past the turbine blades. Because erosion is not uniform from one blade to the next it can eventually lead to an imbalance in the rotor.

A popular means for preventing turbine blade erosion involves fitting an erosion-resistant shield over the outer end of the leading edge of each blade. Typically the shield is fitted to the blade and brazed along its periphery by conventional brazing techniques such as induction heating. Over time, however, even the hardest materials will erode in the environment of the turbine, and thus such erosion shields must be replaced from time to time.

Removal of blades from the rotor is an expensive process resulting in significant down-time for the turbine, but with conventional techniques unless the rotor blade is removed so that a conventional induction heater can be utilized to debraze the shield, the erosion shield must be debrazed using an oxyacetylene welding torch. The uneven heating associated with manual debrazing by means of a welding torch can contribute to stress cracking susceptibility of the blade if the blade is hardened, thus reducing its useful life.

The present invention overcomes these disadvantages by providing a method and apparatus for the in situ debrazing of erosion shields utilizing induction heating rather than an open flame. The invention provides means for debrazing by induction heating and then detaching the erosion shield from the blade without removing the turbine blades from the rotor. The heating process is more controlled and uniform than processes involving an open flame, and better lends itself to automation and remote control by an operator. This not only reduces the cost and duration of the repair process, but also results in a better working environment for repair personnel.

SUMMARY OF THE INVENTION

The present invention thus provides a shield stripping apparatus for removing a shield affixed to a turbine blade by a brazing material comprising means for gripping the blade, means for heating the brazing material, and means for removing the shield attached to the gripping means comprising movable shield engaging means for engaging the shield and means for moving the shield engaging means to detach the shield from the blade after sufficient heat has been generated to melt the brazing material.

The present invention further provides a method of removing a shield affixed to a turbine blade by a brazing material comprising the steps of attaching to the blade a shield stripping apparatus comprising means for gripping the blade, means for heating the brazing material, and means for removing the shield attached to the gripping means comprising movable shield engaging means for engaging the shield and means for moving the shield engaging means to strip the shield from the blade, heating the brazing material, determining when the brazing material is sufficiently hot to permit detachment of the shield from the blade, and detaching the shield from the blade.

BRIEF DESCRIPTION OF THE DRAWINGS

In drawings which illustrate by way of example only a preferred embodiment of the invention.

FIG. 4 is a side elevation showing the apparatus affixed to the blade before detachment of the erosion shield;

FIG. 5 is a side elevation showing the apparatus affixed to the blade with the shield partially detached;

FIG. 6 is a cross-section of a flux concentrator in the induction heater of the present invention.

DETAILED DESCRIPTION OF THE INVENTION

Figure 1:
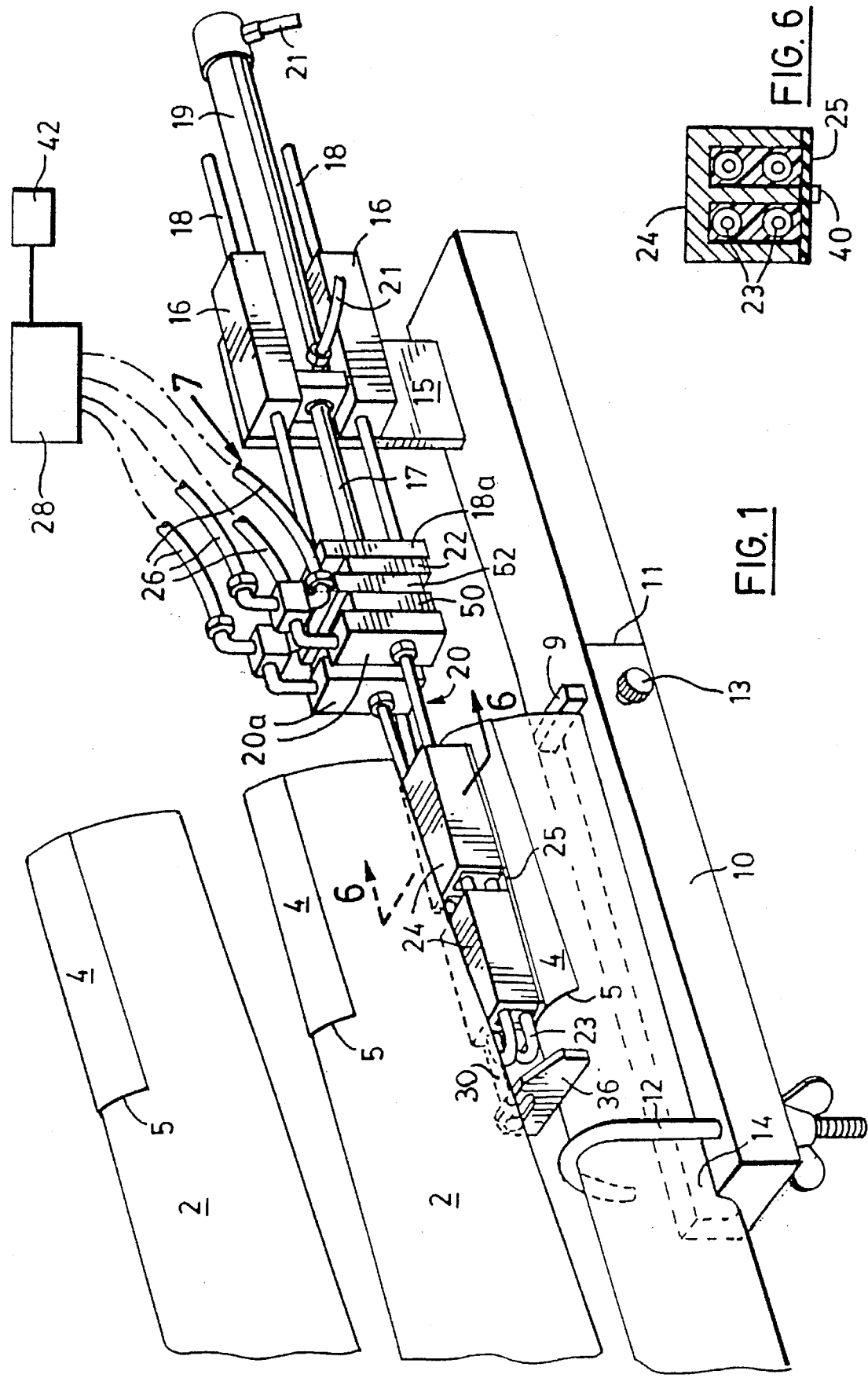
FIG. 1 is a perspective view of an apparatus embodying the invention affixed to a turbine blade.

FIG. 1 illustrates a shield stripping apparatus according to the present invention attached to a turbine blade 2 having an erosion shield 4 brazed along the outer end of its leading edge.

In a preferred embodiment the apparatus includes means for gripping the turbine blade 2 comprising a base 10 having a hooked clamp 12 for removably securing the base 10 to the blade 2. The base 10 preferably includes a groove 14 in which the blade 2 nests to prevent slippage between the base 10 and the blade 2, and the clamp 12 extends over the leading edge of the blade 2 as shown. A block 9 acts as a blade stop to assist in positioning the blade properly within the groove 14. A brass thumbscrew 13 or other suitable securing means that will not scratch or dent the blade 2 secures the outer end of the blade 2 to an intermediate point of the base 10 near the inner end of the groove 14.

The base 10 supports a pair of horizontal guide blocks 16 mounted on a vertical plate 15, through which supporting rods 18 are slidably disposed. The rods 18 terminate in a mounting plate 18a which supports a system of movable blocks 22, 50, 52 that in turn support means for heating the shield 4 comprising an induction heating coil assembly 20, and a stripping arm 30, all of which can thus slide longitudinally relative to the base 10. In the embodiment shown the base 10 is slightly bent at a point 11 just beyond the inner end of the groove 14 (corresponding to the outer end of the blade 2), or a rotatable joint (not shown) may be provided at 11, to compensate for the slight rearward orientation of the trailing edge of the turbine blades 2.

The induction heating coil assembly 20 includes metallic mounting blocks 20a from which an electrical induction heating coil 23 projects longitudinally over the base 10, for generating heat in the blade 2 and shield 4 to melt the brazing material. It will be appreciated that because of the high thermal conductivity of the materials used to form the blade 2 and the shield 4, the shield 4 can be heated or the blade 2 can be heated in the vicinity of the shield 4, and in either case heat will conduct along and through the brazing material. Induction heating coil assembly 20 permits uniform, controlled heating, and the heating coil 23 is accordingly configured to conform to the size of the shield 4 and thus heat the desired area with optimum efficiency.

The heating coil assembly 20 includes "E"-shaped flux concentrators 24 each having a ferrite core, surrounding the heating coil 23 as illustrated in cross-section in FIG. 6. The flux concentrators 24 serve both to focus the electromagnetic field generated by the heating coil 23 over the shield 4, and to direct the field away from and thus to protect adjacent blades 2. The space between the heating coil 23 and the branches of each flux concentrator 24 may be filled with epoxy. A thin layer of thermal insulation 25 covers the bottoms of the flux concentrators 24.

Figure 2:
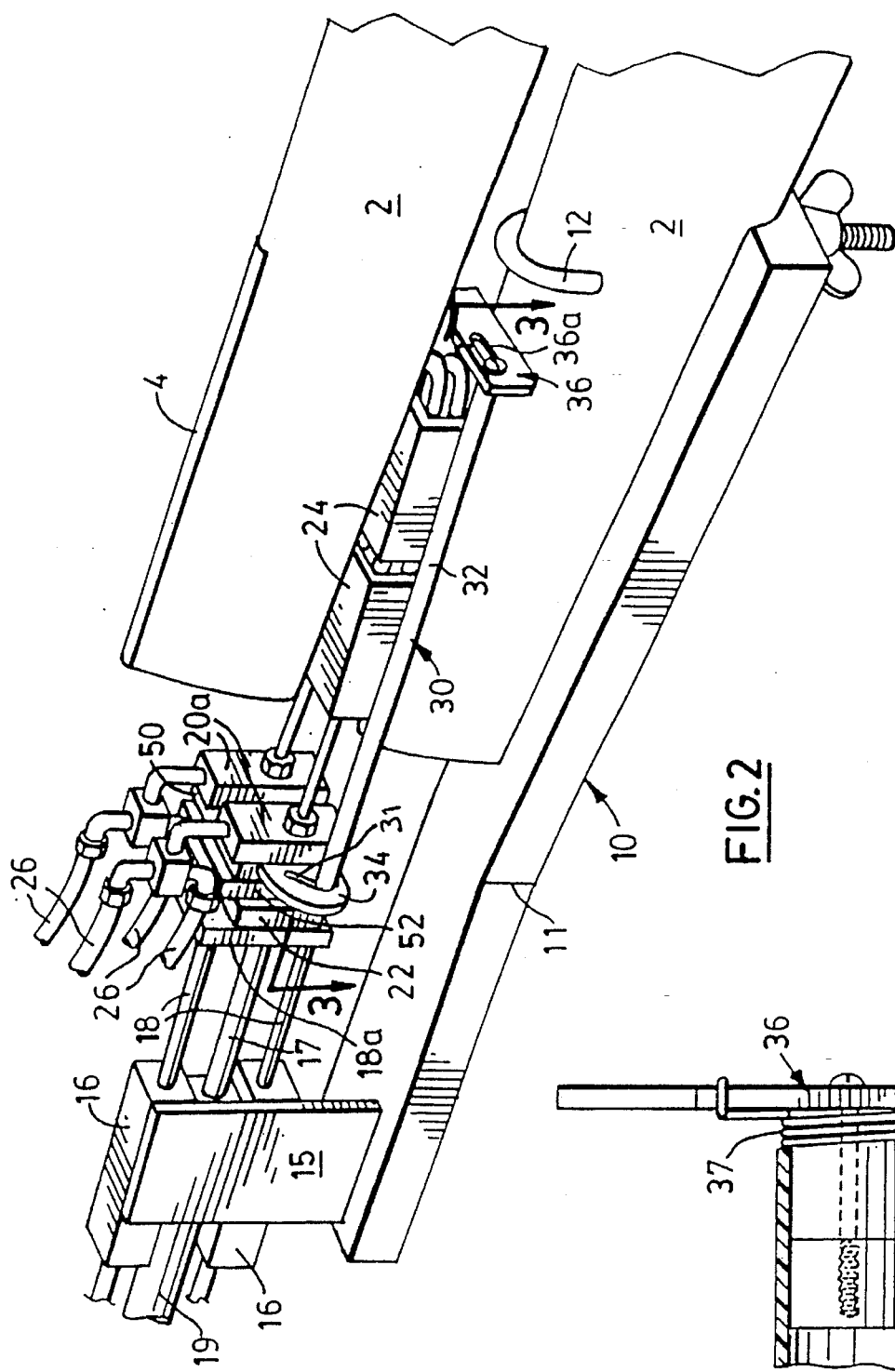
FIG. 2 is a further perspective view of the apparatus shown in FIG. 1.

The stripping arm 30, best seen in FIG. 2, comprises a non-metallic rod 32 projecting longitudinally generally parallel to the base 10 from a support bracket 34 extending from the movable block 50. The rod 32 is spaced laterally from the heating coil assembly 20 so as not to interfere therewith, and is mounted in a slot 31 to allow for adjustment if necessary.

Figure 3:
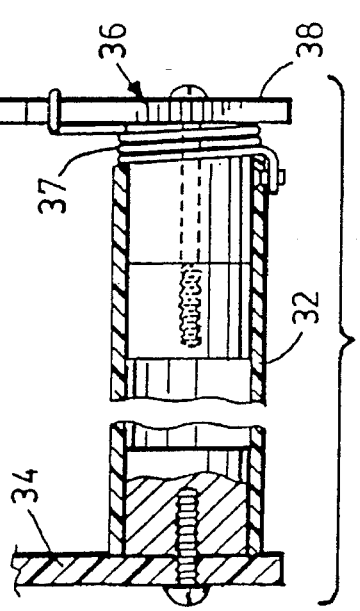
FIG. 3 is a cross-section taken along the line 3—3 in FIG. 2.

Means for engaging the shield 4 comprises a finger 36 attached to the rod 32 and extending transversely over the base 10, beyond the end of the heating coil 23. The finger 36 is composed of a non-metallic and heat resistant material such as "Bakelite" (trade-mark), so as not to heat up in the presence of the induction heating coil assembly 20 nor burn when contacting the hot shield 4. The finger 36 is provided with a lower edge 38 adapted to rest on the blade 2. During the blade stripping process the edge 38 will contact the inner edge 5 of the shield 4, to apply a pulling force generated by the pneumatic cylinder 19 against the shield 4 to detach it from the blade 2, as seen in FIGS. 4 and 5. The finger 36 is rotationally biased by a torsion spring 37 (see FIG. 3) to bear down on the leading edge of the blade 2 and thus resist disengaging from the inner edge 5 of the shield 4 during the stripping process, and preferably is mounted through a slot 36a to allow for lateral adjustment.

Means for moving the mounting block 22 bearing heating coil assembly 20 and stripping arm 30 comprises a pneumatic cylinder 19 supplied by air hoses 21 and having a shaft 17 attached to a plate 15. Flexible water-cooled power cables 26 for supplying electrical power to the induction heating coil assembly 20 couple to electrically conductive metallic mounting blocks 20a, and are provided with sufficient slack between the power source 28 and the metallic mounting blocks 20a to permit free movement of the induction heating coil assembly 20 within the limits of the pneumatic cylinder 19. It will be recognized that the moving means could equally be a hydraulic cylinder, electric motor or any other conventional means.

Figure 7:
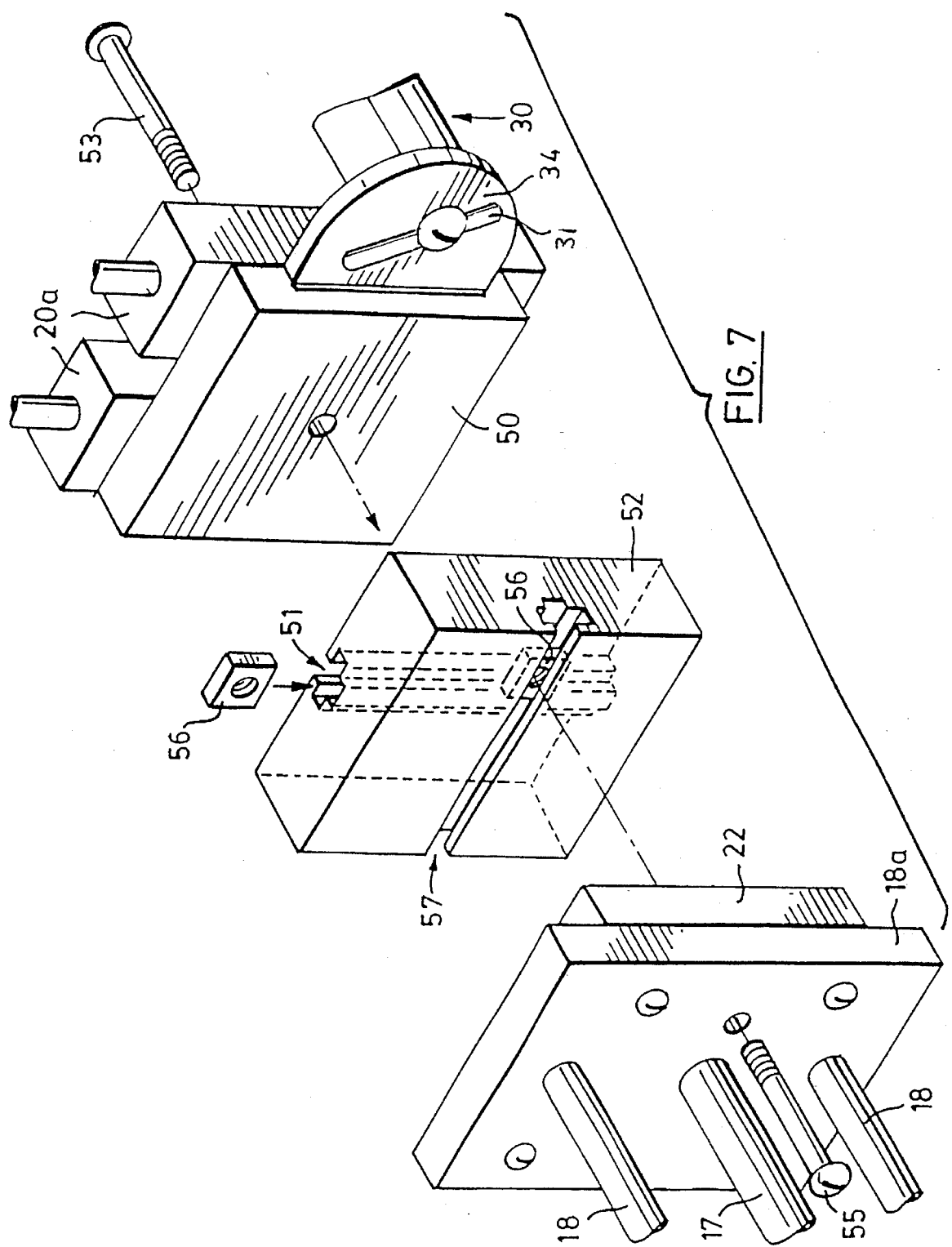
FIG. 7 is an exploded perspective view showing details of the heater mounting assembly.

To accommodate differences in the pitch and height of different turbine blades 2, the heating coil assembly 20 is mounted so as to allow horizontal and vertical adjustment. As shown in FIG. 7, this is accomplished by fixing the metallic mounting blocks 20a to a vertically sliding block 50 of heat-resistant, electrically insulating material, which is attached to a vertical channel 51 in a horizontally sliding block 52 by a screw 53 engaging a nut 56 slidably trapped in the vertical channel 51 in block 52. The horizontally sliding block 52 is in turn attached to the mounting block 22 by a screw 55 engaged in a nut 56 slidably trapped in the horizontal channel 57. Thus, the heater 20 can be adjusted laterally by loosening the screw 55, sliding the block 52 to the desired position and tightening the screw 55. The height of the heater 20, and its pitch, can be adjusted in like fashion by loosening screw 53, sliding block 50 to the desired vertical position and/or rotating it about the screw 53, and tightening the screw 53 to fix the heating coil assembly in position.

The sliding blocks 50, 52 and mounting block 22 should be sufficiently thick that any metal parts of the cylinder or rods are spaced well away from the heating coil assembly 20, to avoid heating of the metal by stray portions of the electromagnetic field generated by the induction heating coil assembly 20.

In operation, the blade 2 is clamped to the base 10 using the clamp 12 and brass screw 13 such that the trailing edge of the blade 2 nests in the groove 14 with the outer end of the blade 2 abutting the block 9. The heating coil assembly 20 and stripping arm 30 are pneumatically extended over the blade 2 with the lower edge 38 of the finger 36 resting on the leading edge of the blade 2 beyond the inner edge 5 of the shield 4, with the flux concentrators 24 suspended over the region of the shield 4, as shown in FIG. 4. The heating coil assembly 20 is then energized, generating heat in the blade 2 and the shield 4 to heat the brazing material until the brazing material melts. The stripping arm 30 (and with it the heating coil assembly 20) is then pneumatically retracted by the cylinder 19, thus detaching the shield 4 from the blade 2, as shown in FIG. 5.

The determination of when debrazing is complete can be made visually, or a timer 42 or one or more temperature sensors 40 such as a thermocouple or fibre optic sensor or the like, embedded in or attached to the flux concentrator, can be employed to automatically shut off power to the heating coil assembly 20 and actuate the pneumatic cylinder 19. A computer (not shown) may be employed to control the operation of the cylinder 19 and induction heating power supply responsive to the temperature sensors 40 or timer 42. Following removal of the shield, the base 10 is manually detached from the blade 2 and the shield 4 can be replaced in a conventional fashion.

It is also contemplated that a brush (not shown) mounted beyond the finger 36 could be employed to clean excess brazing material off of the blade 2 as the cylinder 19 retracts the stripping arm 30.

A preferred embodiment of the invention having thus been described by way of example, it will be obvious to those skilled in the art that certain modifications and adaptations may be made without departing from the scope of invention, as set out in the appended claims.

We claim:

1. A method of removing a shield affixed to a turbine blade by a brazing material comprising the steps of attaching to the blade a shield stripping apparatus comprising means for gripping the blade, means for heating the brazing material, and means for removing the shield attached to the gripping means comprising movable shield engaging means for engaging the shield and means for moving the shield engaging means to strip the shield from the blade, heating the brazing material, determining when the brazing material is sufficiently hot to permit detachment of the shield from the blade, and detaching the shield from the blade.

2. The method of claim 1 in which the step of determining when the brazing material is sufficiently hot involves the use of the temperature sensing device.

3. A shield stripping apparatus for removing a shield affixed to a turbine blade by a brazing material comprising means for gripping the blade, means for heating the brazing material, and means for removing the shield attached to the gripping means, comprising movable shield engaging means for engaging the shield and means for moving the shield engaging means to detach the shield from the blade after sufficient heat has been generated to melt the brazing material.

4. The apparatus of claim 3 in which means for heating comprises an electrical induction heating coil assembly.

5. The apparatus of claim 3 in which shield engaging means comprises a finger for engaging an edge of the shield.

6. The apparatus of claim 3 in which the means for heating and the shield engaging means project from a mounting block attached to the means for moving the shield engaging means.

7. The apparatus of claim 6 in which the means for heating and the shield engaging means are movable by a pneumatic cylinder.

8. The apparatus of claim 3 in which means for gripping the blade includes a base having a notch in which the blade nests and a clamp for removably securing the blade to the base.

9. The apparatus of claim 6 in which the mounting block is movably affixed to a second block by securing means, the second block having a vertical channel to which the securing means is releasably engaged.

10. The apparatus of claim 9 in which the vertical channel is located in a face of the second block and an opposite face of the second block includes a horizontal channel to which is slidably engaged securing means attached to the means for moving the shield engaging means.

11. The apparatus of claim 3 include a temperature sensing device for determining the temperature of the brazing material.

12. The apparatus of claim 5 in which the finger is attached to a non-metallic rod by securing means engaged to a slot in the finger allowing lateral adjustment of the finger.

* * * * *